US008929466B2

(12) United States Patent
Hasegawa et al.

(10) Patent No.: US 8,929,466 B2
(45) Date of Patent: Jan. 6, 2015

(54) DATA RECEIVING CIRCUIT AND SEMICONDUCTOR DEVICE

(71) Applicant: LAPIS Semiconductor Co., Ltd., Yokohama (JP)

(72) Inventors: Hideaki Hasegawa, Yokohama (JP); Kouji Tekeda, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 13/969,210

(22) Filed: Aug. 16, 2013

(65) Prior Publication Data

US 2014/0050285 A1 Feb. 20, 2014

(30) Foreign Application Priority Data

Aug. 20, 2012 (JP) ................................ 2012-181645

(51) Int. Cl.
*H04L 25/00* (2006.01)
*H04L 27/06* (2006.01)
(52) U.S. Cl.
CPC .................................. *H04L 27/066* (2013.01)
USPC .......................................... 375/257; 375/318
(58) Field of Classification Search
USPC ................. 375/257, 220, 316, 318, 350, 229; 327/565–566, 127, 436–437
See application file for complete search history.

(56) References Cited

U.S. PATENT DOCUMENTS

| 6,825,696 | B2 * | 11/2004 | Jaussi et al. ...................... 327/55 |
| 7,272,071 | B2 * | 9/2007 | Notthoff ......................... 365/242 |
| 7,924,055 | B2 * | 4/2011 | Jang ................................ 326/82 |
| 2004/0001385 | A1 * | 1/2004 | Kang ............................. 365/226 |
| 2006/0238037 | A1 * | 10/2006 | Oh et al. ........................ 307/409 |
| 2010/0124298 | A1 * | 5/2010 | Jang ................................ 375/296 |
| 2011/0267022 | A1 * | 11/2011 | Hong et al. .................... 323/299 |

FOREIGN PATENT DOCUMENTS

JP 2008-124697 A 5/2008

* cited by examiner

*Primary Examiner* — Emmanuel Bayard
(74) *Attorney, Agent, or Firm* — Studebaker & Brackett PC

(57) ABSTRACT

A data receiving circuit that can accurately obtain a data signal corresponding to information data from a high speed high density transmitted signal, and a semiconductor device including the data receiving circuit. The amplitude of a first differential signal corresponding to a level difference between a pair of received differential signals, generated in a first differential stage, is amplified and binalized to obtain a received data signal. A second differential signal corresponding to the level difference between the received differential signals, and a third differential signal which is a phase-inverted signal of the second differential signal are generated in a second differential stage provided separately, and a current corresponding to the second differential signal and a current corresponding to the third differential signal are discharged into the respective ones of the pair of transmission lines, thereby suppressing the amplitudes of the received differential signals.

10 Claims, 5 Drawing Sheets

US 8,929,466 B2

DATA RECEIVING CIRCUIT AND SEMICONDUCTOR DEVICE

BACKGROUND OF THE INVENTION

1. Technical Field

The present invention relates to a data receiving circuit that performs various signal processing on a reception signal received through a transmission line, and to a semiconductor device including the data receiving circuit.

2. Description of the Related Art

In recent years, there are increasing demands for high speed, high density data transmission, and a differential transmission method is proposed as a data transmission system that can meet such demands.

In the differential transmission system, information data is converted to a pair of differential signals having polarities different from each other, and these differential signals are transmitted over balanced transmission lines. As a data receiving circuit for receiving such differential signals, there is proposed a circuit that includes a differential input stage for inputting a pair of received differential signals and a level converting stage for converting the levels of the signals inputted to the differential input stage to a level that is usable by logical circuits, wherein the level obtained by the level converting stage is outputted as a data signal (See, for example, FIG. 1 of Japanese Patent Application Laid-Open Publication No. 2008-124697). In this data receiving circuit, a pair of received differential signals (IN1, IN2) are supplied to the gate terminals of transistors M81 and M82 respectively of the differential input stage (M80 to M84) and signals obtained by amplifying a difference value between these differential signals (IN1, IN2) are supplied to the level converting stage (M85 to M88) via lines 3 and 4.

However, high speed, high density transmission may result in rounding of the waveforms of received signals (the pair of differential signals). In such cases, it is difficult to accurately obtain data signals from received signals transmitted with high-speed.

SUMMARY OF THE INVENTION

The present invention has been made to solve the problem described above, and an object of the present invention is to provide a data receiving circuit that can accurately obtain a data signal corresponding to information data from a received signal transmitted at high speed, and a semiconductor device including the data receiving circuit.

The data receiving circuit according to the invention is a data receiving circuit for obtaining a received data signal from a pair of received differential signals received through a pair of transmission lines, and the data receiving circuit includes a first differential stage configured to generate a first differential signal corresponding to a level difference between the pair of received differential signals; a level converting and outputting stage configured to binalize a signal obtained by amplifying an amplitude of the first differential signal to output the binalized signal as the received data signal; a second differential stage configured to generate second and third differential signals, the second differential signal corresponding to the level difference between the pair of differential signals and the third differential signal being a phase-inverted signal of the second differential signal; and an amplitude controlling stage configured to suppress amplitudes of the pair of received differential signals by discharging a current corresponding to the second differential signal and a current corresponding to the third differential signal to respective ones of the pair of transmission lines.

The semiconductor device according to the invention is a semiconductor device including a data receiving circuit for obtaining a received data signal from a pair of received differential signals received through a pair of transmission lines, and the data receiving circuit has a first differential stage configured to generate a first differential signal corresponding to a level difference between the pair of received differential signals; a level converting and outputting stage configured to binalize a signal obtained by amplifying an amplitude of the first differential signal to output the binalized signal as the received data signal; a second differential stage configured to generate second and third differential signals, the second differential signal corresponding to the level difference between the pair of differential signals and the third differential signal being a phase-inverted signal of the second differential signal; an amplitude controlling stage configured to suppress amplitudes of the pair of received differential signals by discharging a current corresponding to the second differential signal and a current corresponding to the third differential signal to respective ones of the pair of transmission lines.

In the data receiving circuit according to the invention, the first differential signals corresponding to the level difference between the pair of received differential signals received through the pair of transmission lines are generated in the first differential stage, and the amplitudes of the first differential signals are amplified and binalized so that the received data signal is obtained. In this configuration, the second differential signal corresponding to the level difference between the pair of differential signals, and the third differential signal which is a phase-inverted signal of the second differential signal are generated in the second differential stage provided separately from the first differential stage, a current corresponding to the second differential signal and a current corresponding to the third differential signal are discharged into the respective ones of the pair of transmission lines, and thereby the amplitudes of the received differential signals are suppressed.

In this manner, even if the waveforms of the pair of received differential signals are rounded, the amplitudes of the differential signals can be suppressed to be the upper limit amplitude or lower that can assure high speed operation, so that a received data signal can be accurately acquired from the pair of received differential signals transmitted at high speed and in high density.

DETAILED DESCRIPTION OF THE PREFERRED EMBODIMENTS

Figure 1:
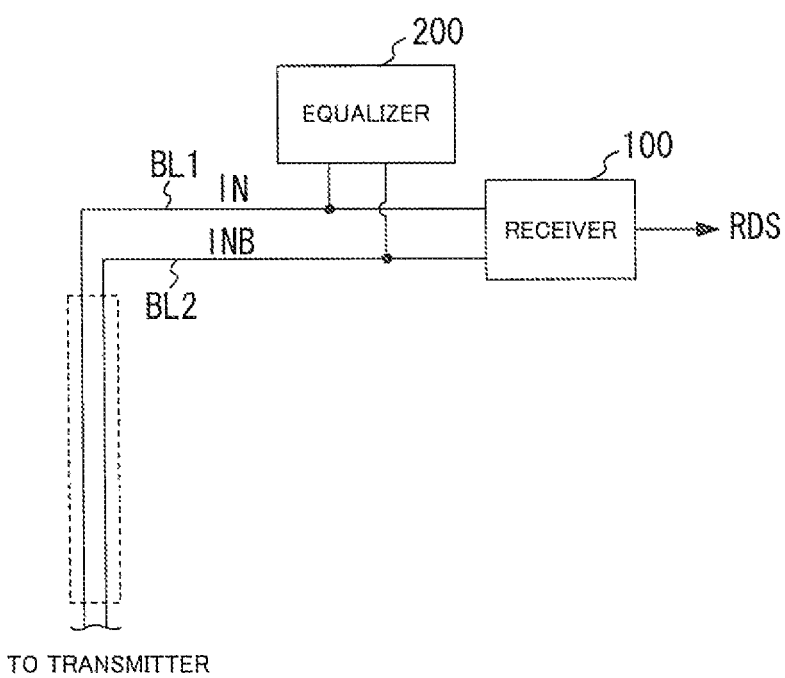
FIG. 1 is a block diagram schematically showing the configuration of a data receiving circuit 10 in accordance with the present invention.

FIG. 1 is a block diagram schematically showing the configuration of a data receiving circuit 10 in accordance with the present invention.

The data receiving circuit 10 is formed on a semiconductor substrate as a semiconductor device. As shown in FIG. 1, the data receiving circuit 10 includes a receiver 100 and an equalizer 200.

The receiver 100 receives differential signals IN and INB having different polarities through balanced transmission lines BL1 and BL2, respectively. The pair of differential signals IN and INB, as received differential signals, are generated on a transmitting end (not shown in FIG. 1) on the basis of information data to be transmitted. The receiver 100 amplifies an amplitude of a signal corresponding to a level difference between the differential signals IN and INB and outputs, as a received data signal RDS, a signal obtained by binarizing the amplitude-amplified signal on the basis of a predetermined threshold value.

The equalizer 200 discharges electric currents into the respective balanced transmission lines BL1 and BL2 with an allocation ratio corresponding to the level difference between the differential signals IN and INB, thereby suppressing the amplitudes of the differential signals IN and INB as received signals.

Figure 2:
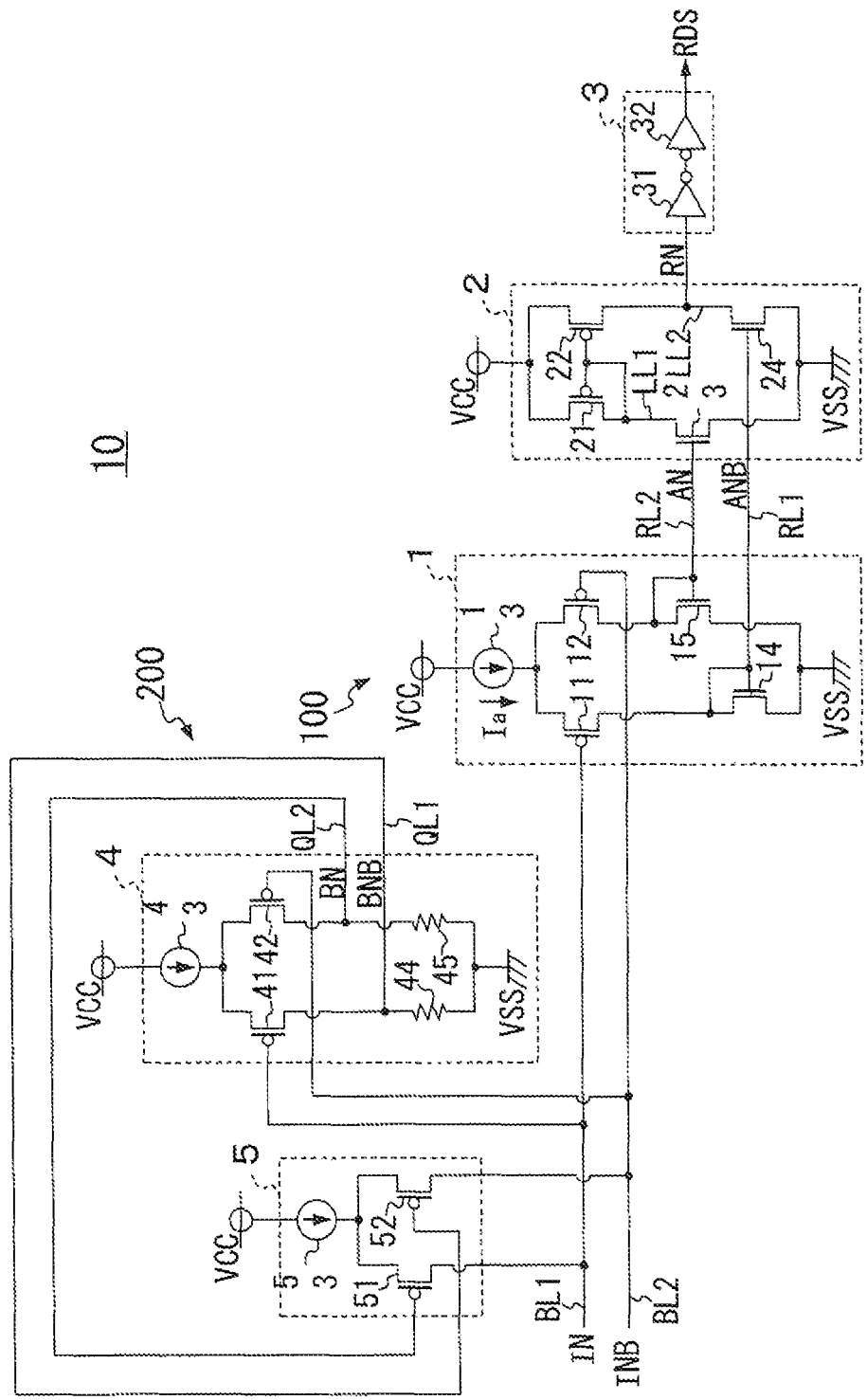
FIG. 2 is a circuit diagram showing an example of the internal configuration of the data receiving circuit 10.

FIG. 2 is a circuit diagram showing the respective internal configurations of the receiver 100 and equalizer 200.

As shown in FIG. 2, the receiver 100 includes a differential amplification stage 1, a level converting stage 2, and an outputting stage 3.

In the differential amplification stage 1, the differential signal IN supplied through the balanced transmission line BL1 is supplied to a gate terminal of a p-channel MOS (Metal Oxide Semiconductor) transistor 11. The differential signal INB supplied through the balanced transmission line BL2 is supplied to a gate terminal of a p-channel MOS transistor 12. Based on a power supply voltage VCC, a constant current source 13 generates a predetermined constant current Ia which, in turn, is supplied to a source terminal of each of the transistors 11 and 12. A drain terminal of the transistor 11 is connected to drain and gate terminals of an n-channel MOS transistor 14. A ground voltage VSS is supplied to a source terminal of the transistor 14 whose gate and drain terminals are further connected to the level converting stage 2 via a relay line RL1. A drain terminal of the transistor 12 is connected to drain and gate terminals of an n-channel MOS transistor 15. The ground voltage VSS is applied to a source terminal of the transistor 15, and whose gate and drain terminals are further connected to the level converting stage 2 via a relay line RL2.

Due to the configuration described above, the differential amplification stage 1 supplies a differential signal ANB, obtained by amplifying a signal corresponding to a level difference between the differential signals IN and INB, to the level converting stage 2 through the relay line RL1 and also supplies a differential signal AN, which is a phase-inverted signal of the differential signal ANB, to the level converting stage 2 through the relay line RL2.

In the level converting stage 2, the power supply voltage VCC is applied to a source terminal of each of p-channel MOS transistors 21 and 22. A gate terminal of each of the transistors 21 and 22 is connected to each other. The gate terminal and a drain terminal of the transistor 21 are connected to a drain terminal of an n-channel MOS transistor 23 through a line LL1. The differential signal AN from the differential amplification stage 1 is supplied to a gate terminal of the transistor 23 through the relay line RL2, and the ground voltage VSS is applied to a source terminal of the transistor 23. A drain terminal of the transistor 22 is connected to a drain terminal of an re-channel MOS transistor 24 via a line LL2. The differential signal ANB from the differential amplification stage 1 is supplied to a gate terminal of the transistor 24 through the relay line RL1, and the ground voltage VSS is applied to a source terminal of the transistor 24.

Due to the configuration described above, the level converting stage 2 produces, as an amplitude amplified signal RN, a signal obtained by a level conversion, within a range between the ground voltage VSS and the power supply voltage VCC, of a signal corresponding to a difference between the differential signals AN and ANB, and supplies the thus obtained amplitude amplified signal RN to the outputting stage 3 through the line LL2.

The outputting stage 3 includes inverters 31 and 32, which are connected in series, and binarizes the amplitude amplified signal RN supplied from the level converting stage 2. More specifically, the outputting stage 3 generates a binary signal corresponding to a logic level "1" which indicates a high level when the signal level of the amplitude amplified signal RN is higher than a threshold value Vth of the transistor, and a binary signal corresponding to a logic level "0" which indicates a low level when the signal level of the amplitude amplified signal RN is equal to or below the threshold value Vth. The outputting stage 3 outputs the binary signal as a received data signal RDS.

As shown in FIG. 2, the equalizer 200 includes a differential amplification stage 4 and an amplitude controlling stage 5.

In the differential amplification stage 4, the differential signal IN, which is supplied through the balanced transmission line BL1, is supplied to a gate terminal of a p-channel MOS transistor 41. The differential signal INB, which is supplied through the balanced transmission line BL2, is supplied to a gate terminal of a p-channel MOS transistor 42. Based on the power supply voltage VCC, a constant current source 43 generates a predetermined constant current and supplies it to a source terminal of each of the transistors 41 and 42. A drain terminal of the transistor 41 is connected to an end of a resistor 44 and the amplitude controlling stage 5 via a line QL1. To the other end of the resistor 44 the ground voltage VSS is applied. A drain terminal of the transistor 42 is connected to an end of a resistor 45 and the amplitude controlling stage 5 via a line QL2. To the other end of the resistor 45 the ground voltage VSS is applied.

Due to the configuration described above, the differential amplification stage 4 supplies to the amplitude controlling stage 5 through the line QL1 a differential signal BNB obtained by amplifying a signal corresponding to a level difference between the differential signals IN and INB, and also supplies to the amplitude controlling stage 5 through the line QL2 a differential signal BN, which is obtained by amplifying a phase-inverted signal of the differential signal BNB.

In the amplitude controlling stage 5, the differential signal BN is supplied to a gate terminal of a p-channel MOS transistor 51 through the line QL2, and the differential signal BNB is supplied to a gate terminal of a p-channel MOS transistor 52 through the line QL1. Based on the power supply voltage VCC, a constant current source 53 generates a predetermined constant current, and supplies it to a source terminal of each of the transistors 51 and 52. A drain terminal of the transistor 51 is connected to the balanced transmission line BL1, and a drain terminal of the transistor 52 to the balanced transmission line BL2.

Due to the configuration described above, the lower the level of the differential signal BN generated by the differential amplification stage 4 is, the higher current the transistor 51 of the amplitude controlling stage 5 supplies to the balanced transmission line BL1. Similarly, the lower the level of the differential signal BNB generated by the differential amplification stage 4 is, the higher current the transistor 52 of the amplitude controlling stage 5 supplies to the balanced transmission line BL2. Consequently, the lower the signal levels of the differential signals IN and INB are, the more greatly the signal levels increase, thus resulting in lowering of the amplitudes of the differential signals IN and INB as received signals.

Therefore, the equalizer 200 makes it possible to limit the amplitudes of the differential signals IN and INB, immediately before these signals are fed into the receiver 100, to values equal to or below an upper limit of the amplitude value described below which assures high speed operation (hereinafter referred to as "upper limit amplitude").

Figure 3:
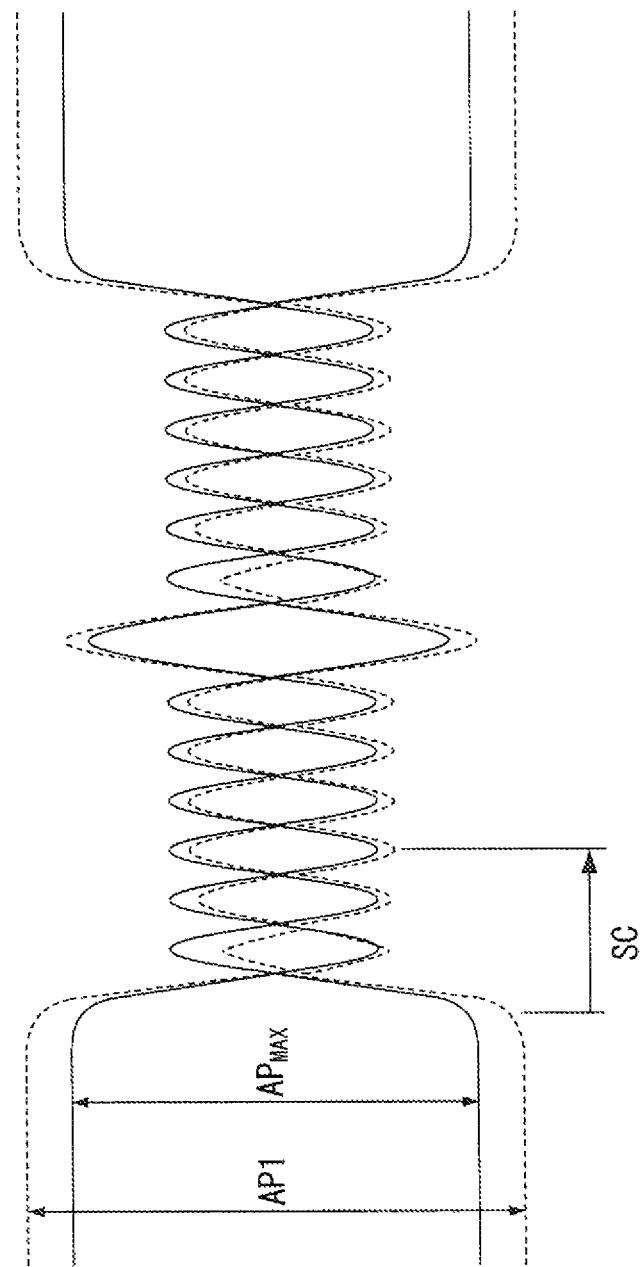
FIG. 3 is a waveform diagram showing an example of the waveforms of differential signals (IN, INB)

FIG. 3 is a waveform diagram comparatively shows an example of the waveform of the differential signals (IN, INB) obtained when the equalizer 200 is provided in the data receiving circuit 10 (shown by a solid line) and an example of the waveform of the differential signals (IN, INB) obtained when the equalizer 200 is not provided in the data receiving circuit 10 (shown by a broken line).

First, in a case where the equalizer 200 is not provided, the differential signal (IN, INB) has an amplitude AP1 which is larger than an upper limit amplitude $AP_{MAX}$ as illustrated by the broken line in FIG. 3 in a section in which the period of alternation of the differential signal is relatively long. Subsequently, when the differential signal has moved to a section in which the period of alteration of the differential signal is short, the amplitude of the signal becomes reduced. However, a certain time period SC is required before the amplitude of the signal becomes stable after the period of alteration has been shortened, as illustrated by the broken line in FIG. 3. This is because the amplitude of the signal immediately before the shortening of the period, like the amplitude AP1, was larger than the upper limit amplitude $AP_{MAX}$.

On the other hand, in a case where the equalizer 200 is provided, the amplitudes of the differential signals (IN, INB) are controlled to be on the upper limit amplitude $AP_{MAX}$ in the section in which the period of alteration of the differential signal is relatively long, as illustrated by the solid line in FIG. 3. When the differential signal has moved to the section in which the period of alteration of the differential signals is short, the amplitude of the signal swiftly becomes stable because the amplitude of the signal immediately before the shortening of the period was at the upper limit amplitude $AP_{MAX}$ which assures high speed operation.

In this way, even if the waveform of the received differential signal (IN, INB) is rounded, the amplitude of the received differential signal can always be controlled by means of the equalizer 200 within the upper limit amplitude that can assure high speed operation. This allows an accurate acquisition of the data signal from the differential signals (IN, INB) at the following stage in the receiver 100.

In the equalizer 200 shown in FIG. 2, the differential signals BN and BNB generated in the differential amplification stage 4 are directly supplied to the gate terminals of the transistors 51 and 52 of the amplitude controlling stage 5, respectively. However, the differential signals BN and BNB may be delayed by a predetermined period of time and subsequently supplied to the gate terminals of the transistors 51 and 52, respectively.

Figure 4:
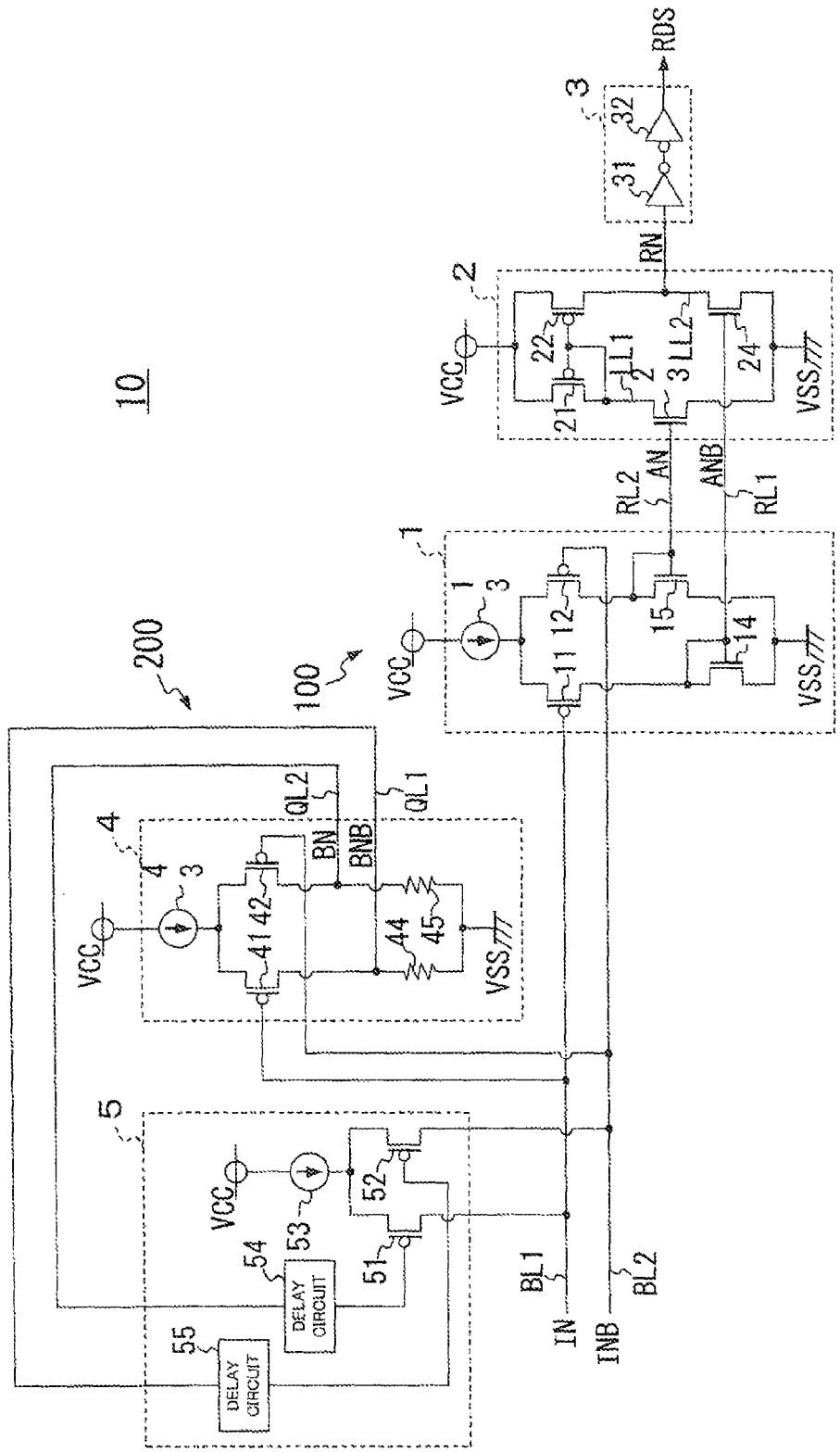
FIG. 4 is a circuit diagram showing a modification of the data receiving circuit 10 shown in FIG. 1.

FIG. 4 is a circuit diagram showing a modified embodiment of the data receiving circuit 10 shown in FIG. 1 configured in consideration of the point stated above.

In the configuration shown in FIG. 4, the differential signal BN generated in the differential amplification stage 4 is supplied to the gate terminal of the transistor 51 through a delay circuit 54, and the differential signal BNB to the gate terminal of the transistor 52 through a delay circuit 55. In other aspects, the configuration shown in FIG. 4 is identical with the configuration shown in FIG. 1.

In FIG. 4, the delay circuit 54 delays the differential signal BN sent by the differential amplification stage 4 to the line QL2 by a predetermined period of time and supplies the delayed differential signal to the gate terminal of the transistor 51 of the amplitude controlling stage 5. The delay circuit 55 delays by a predetermined period of time the differential signal BNB sent by the differential amplification stage 4 to the line QL1 and supplies the delayed differential signal to the gate terminal of the transistor 52 of the amplitude controlling stage 5. Respective delay times of the delay circuits 54 and 55 are selected to be shorter than a minimum period which the differential signals IN and INB can have.

By the provision of the delay circuits 54 and 55, it is possible to perform the amplitude limiting process based on the differential signal BN (BNB) in a state that phase matching with the received differential signal BN and BNB is being made. This allows an improvement in accuracy of the amplitude limiting process as compared with the configuration shown in FIG. 1.

Alternatively, DC (direct current) adjusting circuits for adjusting respective DC levels of the received differential signals IN and INB may be provided in the equalizer 200 shown in FIG. 2 or 4.

Figure 5:
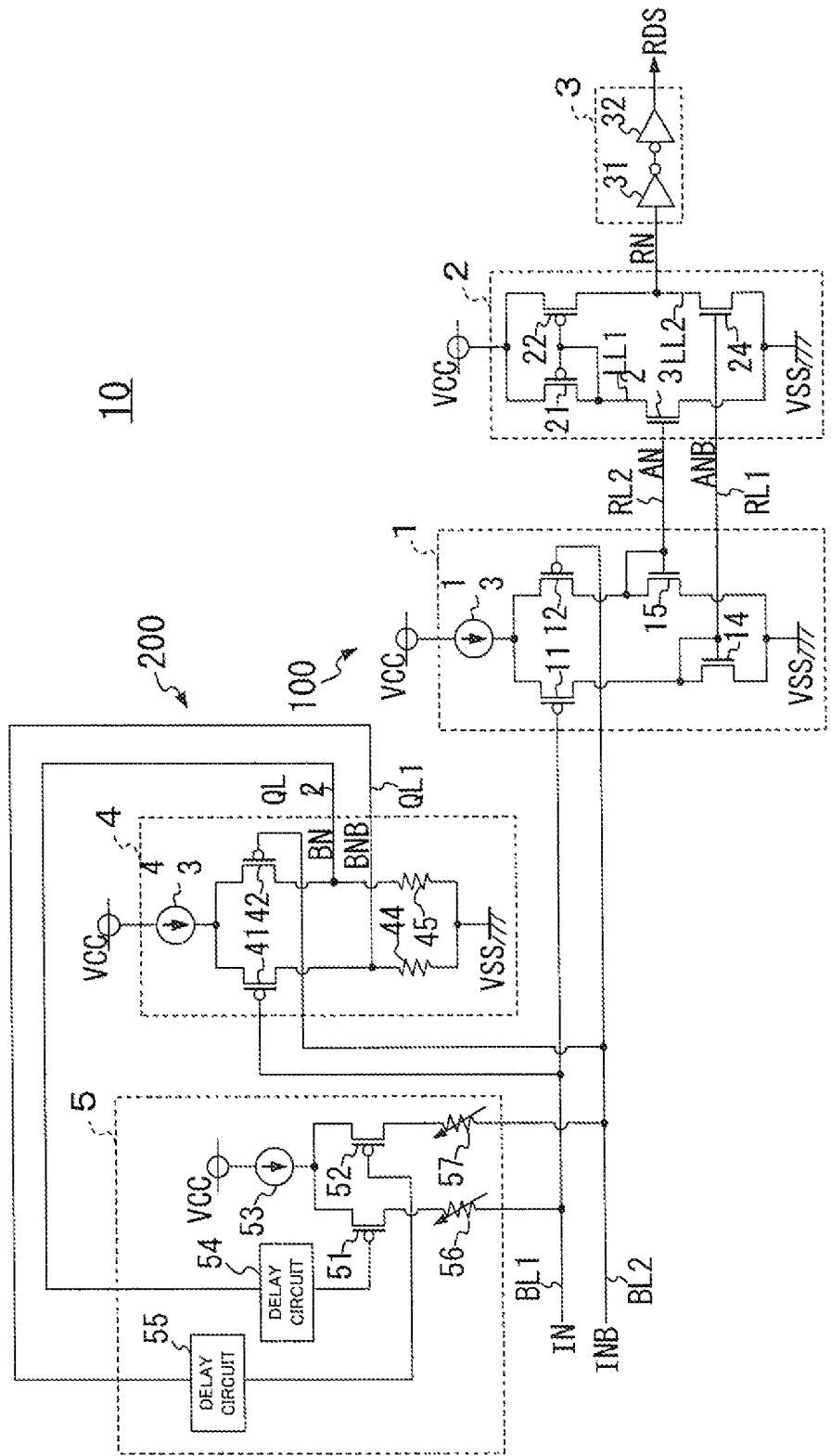
FIG. 5 is a circuit diagram showing a modification of the data receiving circuit 10 shown in FIG. 4.

FIG. 5 is a circuit diagram showing a modification of the data receiving circuit 10 shown in FIG. 4 implemented in view of the point described above.

The configuration shown in FIG. 5 is identical with that shown in FIG. 4 except that variable resistors 56 and 57 as DC adjusting circuits are provided in the equalizer 200.

In the equalizer 200 shown in FIG. 5, the variable resistor 56 is connected between the drain terminal of the transistor 51 and the balanced transmission line BL1, and the variable resistor 57 between the drain terminal of the transistor 52 and the balanced transmission line BL2. To be more specific, the DC (Direct Current) levels of the received differential signals IN and INB are configured to be individually adjustable by changing the resistance values of the respective variable resistors 56 and 57.

In the above embodiments, the p-channel transistors 11, 12, 41, 42, 51 and 52 are used as transistors to receive the differential signals (IN, INB, BN, BNB). However, re-channel MOS transistors may be used as the transistors 11, 12, 41, 42, 51 and 52. Alternatively, an n-channel MOS transistor may be used as one of the transistors 11 (41, 51) and 12 (42, 52), and a p-channel MOS transistor as the other of the transistors 11 (41, 51) and 12 (42, 52).

Briefly speaking, the data receiving circuit 10 is configured to suppress the amplitudes of the pair of received differential signals (IN, INB) by the equalizer (200) when obtaining the received data signal (RDS) from the received differential signals (IN, INB) received through the pair of transmission lines (BL1, BL2) in the receiver (100) which includes the first differential stage (1) and the level converting and outputting stage (2, 3). The level converting and outputting stage consists of the level converting stage 2 and the outputting stage 3 typically shown in FIG. 2. Concretely, in the receiver (100), the first differential signal (AN, ANB) corresponding to a level difference between the pair of received differential signals described above is generated in the first differential stage (1), and the amplitude of the first differential signal is amplified by the level converting and outputting stage (2, 3) so that the binarized signal is obtained as the received data signal. In the equalizer (200), the second differential signal corresponding to a level difference between the pair of received differential signals and the third differential signal which is a phase-inverted signal of the second differential signal (BNB, BN) are generated in the second differential stage (4), a current corresponding to the second differential signal and a current corresponding to the third differential signal are discharged to the respective ones of the pair of transmission lines in the amplitude controlling stage (5), and thereby the amplitudes of the received differential signals are suppressed.

Therefore, even if the waveforms of the pair of the received differential signals are rounded, the amplitudes of the received differential signals can be suppressed to be the upper limit amplitude ($AP_{MAX}$) or lower that can assure high speed operation, so that the receiver (100) can accurately acquired the received data signal from the pair of received differential signals transmitted at high speed and in high density.

This application is based on Japanese Patent Application No. 2012-181645 which is herein incorporated by reference.

What is claimed is:

1. A data receiving circuit for obtaining a received data signal from a pair of received differential signals received through a pair of transmission lines, said data receiving circuit comprising:
    a first differential stage configured to generate a first differential signal corresponding to a level difference between said pair of received differential signals;
    a level converting and outputting stage configured to binalize a signal obtained by amplifying an amplitude of said first differential signal to output said binalized signal as said received data signal;
    a second differential stage configured to generate second and third differential signals, said second differential signal corresponding to said level difference between said pair of differential signals and said third differential signal being a phase-inverted signal of the second differential signal; and
    an amplitude controlling stage configured to suppress amplitudes of said pair of received differential signals by discharging a current corresponding to said second differential signal and a current corresponding to said third differential signal to respective ones of said pair of transmission lines.

2. The data receiving circuit according to claim 1, wherein said amplitude controlling stage includes:
    a first transistor configured to discharge said current corresponding to said second differential signal to one of said pair of transmission lines; and
    a second transistor configured to discharge said current corresponding to said third differential signal to the other of said pair of transmission lines.

3. The data receiving circuit according to claim 2 further comprising:
    a first delay circuit configured to delay said second differential signal by a predetermined period of time and supply said delayed signal to said first transistor; and
    a second delay circuit configured to delay said third differential signal by a predetermined period of time and supply said delayed signal to said second transistor.

4. The data receiving circuit according to claim 2 further comprising:
    a first variable resistor connected between said first transistor and said one of said pair of transmission lines, said first variable resistor configured to adjust an amount of a current corresponding to said second differential signal; and
    a second variable resistor connected between said second transistor and the other of said pair of transmission lines, said second variable resistor configured to adjust an amount of a current corresponding to said third differential signal.

5. The data receiving circuit according to claim 3 further comprising:
    a first variable resistor connected between said first transistor and said one of said pair of transmission lines, said first variable resistor configured to adjust an amount of a current corresponding to said second differential signal; and
    a second variable resistor connected between said second transistor and the other of said pair of transmission lines, said second variable resistor configured to adjust an amount of a current corresponding to said third differential signal.

6. A semiconductor device including a data receiving circuit for obtaining a received data signal from a pair of received differential signals received through a pair of transmission lines, said data receiving circuit comprising:
    a first differential stage configured to generate a first differential signal corresponding to a level difference between said pair of received differential signals;
    a level converting and outputting stage configured to binalize a signal obtained by amplifying an amplitude of said first differential signal to output said binalized signal as said received data signal;
    a second differential stage configured to generate second and third differential signals, said second differential signal corresponding to said level difference between said pair of differential signals and said third differential signal being a phase-inverted signal of the second differential signal; and
    an amplitude controlling stage configured to suppress amplitudes of said pair of received differential signals by discharging a current corresponding to said second differential signal and a current corresponding to said third differential signal to respective ones of said pair of transmission lines.

7. The semiconductor device according to claim 6, wherein said amplitude controlling stage includes:
    a first transistor configured to discharge said current corresponding to said second differential signal to one of said pair of transmission lines; and
    a second transistor configured to discharge said current corresponding to said third differential signal to the other of said pair of transmission lines.

8. The semiconductor device according to claim 7 further comprising:
    a first delay circuit configured to delay said second differential signal by a predetermined period of time and supply said delayed signal to said first transistor; and
    a second delay circuit configured to delay said third differential signal by a predetermined period of time and supply said delayed signal to said second transistor.

9. The semiconductor device according to claim 7 further comprising:
    a first variable resistor connected between said first transistor and said one of said pair of transmission lines, said first variable resistor configured to adjust an amount of a current corresponding to said second differential signal; and
    a second variable resistor connected between said second transistor and the other of said pair of transmission lines, said second variable resistor configured to adjust an amount of a current corresponding to said third differential signal.

10. The semiconductor device according to claim 8 further comprising:
- a first variable resistor connected between said first transistor and said one of said pair of transmission lines, said first variable resistor configured to adjust an amount of a current corresponding to said second differential signal; and
- a second variable resistor connected between said second transistor and the other of said pair of transmission lines, said second variable resistor configured to adjust an amount of a current corresponding to said third differential signal.

* * * * *